W. C. Van Hoesen
Automatic Gate,

N° 8,894.

Patented Apr. 20, 1852.

UNITED STATES PATENT OFFICE.

WILLIAM C. VAN HOESEN, OF LEEDS, NEW YORK.

BALANCE-GATE.

Specification of Letters Patent No. 8,894, dated April 20, 1852.

*To all whom it may concern:*

Be it known that I, WILLIAM C. VAN HOESEN, of Leeds, in the county of Greene and State of New York, have invented a new and Improved Balance-Gate Which May be Opened and Closed by the Driver of a Vehicle Without Said Driver Leaving His Seat; and I do hereby declare that the following is a full, clear, and exact description of the construction and operation of the same, reference being had to the annexed drawings, making a part of this specification, in which—

Figure 2:
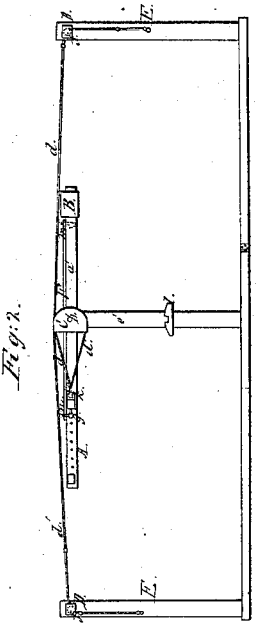
Figure 1:
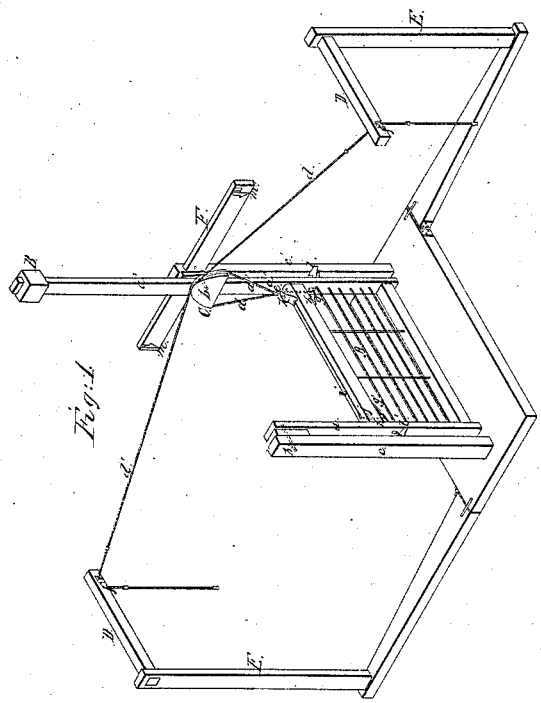

Figure 1, is an isometrical view of the gate, the gate represented as being closed. Fig. 2, is a side elevation of ditto the gate represented as being opened or raised.

Similar letters of reference indicate corresponding parts in each of the two figures.

The nature of my invention consists in constructing a gate and so arranging its several parts, that it may be opened and closed by the driver of a vehicle without said driver leaving his seat, this is effected by hanging the gate on pivots, the pivots passing through the two side pieces of the gate and through the gate posts; one of the side pieces of the gate extends upward some distance above the pivot and has a weight or counterpoise upon it which causes the gate to be balanced upon the pivots. The gate is provided with two latches which are operated upon by two ropes or cords passing over a semi or half pulley attached to the longest of the two side pieces and at a point about where the pivot is placed, the ropes or cords pass over a small pulley fixed in horizontal arms attached to upright posts an arm being on each side of the gate; the horizontal arms are sufficiently elevated to allow the driver to catch the end of the rope as the vehicle approaches the gate, upon pulling the rope the latches of the gate are relieved from the catches, and the gate being balanced by the weight or counterpoise above mentioned, the semi or half pulley will turn and the gate consequently rise, one of the latches fastening itself when the gate is in a horizontal position in a catch attached to a horizontal arm on one of the gate posts. When the vehicle has passed through the gate the driver pulls the rope which is on the opposite side from that which he entered and the latch is relieved from the catch in the horizontal arm above mentioned, and the gate descends to its original position and is closed.

To enable others skilled in the art to make and use my invention I will proceed more fully to describe its construction and operation.

A, is the gate having its two side pieces (*a*) (*a'*) hung by pivots (*b*) (*b*) to the gate posts (*c*) (*c'*), the pivots are represented by dotted lines in Fig. 1; the side piece (*a'*) extends upward some distance and has a weight or counterpoise B, upon it which exactly balances the gate A, upon the pivots (*b*) (*b*).

C, is a semi or half pulley attached to the side piece (*a'*) at about where the pivot passes through, two cords or ropes (*d*) (*d'*) pass around this semi or half pulley and are attached to the small upright rod (*e*). The other ends of the two ropes pass around pulleys (*f*) (*f*) placed in horizontal arms D, D, said arms being framed in upright posts E, E, an arm and post being on each side of the gate; the small upright rod (*e*) is attached at its lower end to the latch (*g*) which is pressed into the catch (*l*) by the spring (*h*) see Fig. 1, at the opposite end of the gate there is a similar latch (*g'*) and catch (*l'*), said latch having a cord (*i*) attached to it and passing over a pulley (*j*) in the upper cross rail of the gate directly over the latch this cord passes along on the upper surface of the cross rail and passes under a small pulley (*k*) and is then attached to the small upright (*e*). By this arrangement both of the latches (*g*) (*g'*) are relieved from the catches (*l*) (*l'*) by raising upward the small upright (*e*) as will readily be seen. F, is a horizontal cross piece attached to the gate post (*c'*) at the upper end, this cross piece has two catches (*m*) (*m'*) upon it, one at each end, into which the latch (*g*) is forced by the spring (*h*) when the gate is opened or raised in a horizontal position, as will be presently explained.

The several parts being now described, I will proceed to show the mode of operation. Suppose for instance, that a vehicle is approaching the gate in the direction indicated by the arrow Fig. 1; the driver by pulling or drawing down the end of the rope (*d*) will raise the two latches (*g*) (*g'*) by which the latches are released from the catches (*l*) (*l'*) and the gate A, being balanced on the pivots (*b*) (*b*) by means of the weight or counterpoise B, the semi or half pulley C, will turn, by the pulling of the rope (*d*) and the gate A, will consequently rise or turn on the pivots (*b*) (*b*) as soon as the latches are released from the catches, when the gate reaches a horizontal position it is retained there by means of the latch (*g*) being forced into the catch (*m*) see Fig. 2, by the small spring (*h*); the vehicle then passes through, and the driver pulls or draws down the end of the rope (*d'*) which releases the latch (*g*) from the catch (*m*) and the semi or half pulley turns and the gate descends to its original and vertical position, the latch being forced into the catch (*l*) by the spring (*h*). The operation is precisely similar if the vehicle is approaching the gate in the opposite direction, the driver pulling the end of the cord (*d'*) and the latch (*g*) would be forced into the catch (*m'*) and be retained in a horizontal position.

By the above arrangement the gate may be opened and closed without any inconvenience by the driver, and with little or no delay, the parts are simple, and not liable to get out of repair, neither is the gate expensive to make, it is free from the objection of sagging and no casualty is likely to prevent its operating perfectly.

Having thus described the nature and operation of my invention what I claim as new and desire to secure by Letters Patent, is,

The method of opening and closing the gate A, substantially as herein shown and described, viz, by means of the ropes or cords (*d*) (*d'*) passing over the semi or half pulley C, and attached to the small upright (*e*) said pulley C being attached to one of the side pieces (*a'*) of the gate, the gate being hung upon pivots (*b*) (*b*) and balanced by the weight or counterpoise B, the several parts being operated as set forth.

WM. C. VAN HOESEN.

Witnesses:
 ROBT. DORLON,
 WILLIAM L. SALISBURY.